(12) United States Patent
Bianchi et al.

(10) Patent No.: US 11,314,240 B2
(45) Date of Patent: Apr. 26, 2022

(54) METHOD AND SYSTEM FOR AUTOMATIC SELECTION OF PHYSICAL QUANTITY MEASUREMENTS

(71) Applicant: ABB SCHWEIZ AG, Baden (CH)

(72) Inventors: Lorenzo Bianchi, San Giovanni Valdarno (IT); Francesca Mazziotti, Montevarchi (IT)

(73) Assignee: ABB Schweiz AG, Baden (CH)

( * ) Notice: Subject to any disclaimer, the term of this patent is extended or adjusted under 35 U.S.C. 154(b) by 36 days.

(21) Appl. No.: 16/610,094

(22) PCT Filed: Apr. 19, 2018

(86) PCT No.: PCT/EP2018/060024
§ 371 (c)(1),
(2) Date: Nov. 1, 2019

(87) PCT Pub. No.: WO2018/202429
PCT Pub. Date: Nov. 8, 2018

(65) Prior Publication Data
US 2020/0081424 A1 Mar. 12, 2020

(30) Foreign Application Priority Data
May 3, 2017 (EP) .................................... 17169223

(51) Int. Cl.
*G05B 23/02* (2006.01)
*G06Q 50/06* (2012.01)

(52) U.S. Cl.
CPC ......... *G05B 23/0221* (2013.01); *G06Q 50/06* (2013.01)

(58) Field of Classification Search
CPC ............................ G05B 23/0221; G06Q 50/06
See application file for complete search history.

(56) References Cited

U.S. PATENT DOCUMENTS

| 8,452,461 B2* | 5/2013 | Sawyer | H01L 31/02021 700/291 |
| 8,659,186 B2* | 2/2014 | Teichmann | H02J 3/386 307/58 |
| 2008/0312756 A1* | 12/2008 | Grichnik | G05B 19/0423 700/29 |

(Continued)

FOREIGN PATENT DOCUMENTS

EP 3125393 A1 2/2017

OTHER PUBLICATIONS

Mazl et al., Sensorfursion for Inertial Navigation FO Trains in GPS-Dark Areas, IEEE, p. 345-350, 2003 (Year: 2003).*

(Continued)

*Primary Examiner* — Raymond L Nimox
(74) *Attorney, Agent, or Firm* — Patterson Intellectual Property Law, P.C.

(57) ABSTRACT

A system is disclosed comprising: a plurality of electronic measuring devices adapted to provide measurement data of a set of physical quantities; wherein the measurement data from each measuring device are characterized by at least one respective measuring characteristic;
a data processing arrangement, configured to calculate at least two measurements for each physical quantity based on said measurement data; and further configured to select a best measurement for each physical quantity based on said measuring characteristics.

11 Claims, 5 Drawing Sheets

(56) References Cited

U.S. PATENT DOCUMENTS

| | | | |
|---|---|---|---|
| 2014/0278332 A1* | 9/2014 | Grammatikakis | H02S 50/00 |
| | | | 703/18 |
| 2016/0292046 A1* | 10/2016 | Botarelli | H04Q 9/04 |
| 2017/0005515 A1* | 1/2017 | Sanders | H02J 3/32 |
| 2017/0170781 A1* | 6/2017 | Kouno | H02S 50/10 |
| 2017/0176505 A1* | 6/2017 | Ramachandran | H02J 13/0086 |

OTHER PUBLICATIONS

Muscas C. et al: Optimal Allocation of Multichannel Measurement Devices for Distribution State Estimation:, IEEE Transactions on Instrumentation and Measurement, IEEE Service Center, Piscataway, NJ, US, vol. 58, No. 6, Jun. 1, 2009, pp. 1929-1937, XP011248496, ISSN: 0018-9456 chapters II to IV.

Jie Wan et al: "Meter placement for load estimation in radial power distribution systems", Proceedings / 2004 IEEE International Symposium on Circuits and Systems: May 23-26, 2004, Sheraton Vancouver Wall Centre Hotel, Vancouver, British Columbia, Canada, IEEE Operations Center, Piscataway, NJ, vol. 5, May 23, 2004 (May 23, 2004), pp. 916-919, XP010720504, ISBN: 978-0-7803-8251-0 abstract.

International Search Report for PCT/EP2018/060024, International Filing Date Apr. 19, 2018 (Apr. 19, 2018) (Priority Date May 3, 2017 (May. 3, 2017), Date of completion of international search report May 3, 2018, Date of Mailing of international search report dated May 17, 2018.

Mazl R et al: "Sensor Data Fusion for Inertial Navigation of Trains in GPS-dark areas", Proc. IEEE Intelligent Vehicle Symposium, 2003, Jun. 9, 2003 (Jun. 9, 2003), pp. 345-350, XP010645900, ISBN: 978-0-7803-7848-3.

* cited by examiner

METHOD AND SYSTEM FOR AUTOMATIC SELECTION OF PHYSICAL QUANTITY MEASUREMENTS

TECHNICAL FIELD

The present invention concerns data collecting systems, where physical quantities are measured by means of measuring devices and measurement data relating to a plurality of physical quantities are collected in a data collecting arrangement. Embodiments disclosed herein specifically relate to systems comprised of electronic measuring devices for measuring physical quantities and at least one data collecting arrangement for collecting and managing measurement data.

BACKGROUND ART

In many applications the need exists for collecting measuring data concerning one or more physical quantities and for delivering said data to a data collecting arrangement for further data processing. The physical quantities may be operating parameters of electronic or mechanical devices, environmental parameters, such as temperature, pressure, humidity, light or electromagnetic radiation, noise, vibrations, chemical composition of liquid or gaseous flows, wind speed, as well as other physical quantities or parameters which may be needed for process control purposes, for instance.

For example, power plants, which convert energy from a renewable energy resource into useful electrical energy are usually comprised of a plurality of devices which may require periodical or continuous control from a local or remote control unit. Devices that convert a renewable energy into electrical energy may comprise photovoltaic panels, wind turbines, water turbines, fuel cells, gas or steam expanders, as well as relevant energy converting apparatuses, such as electrical generators, electrical energy converters or inverters, and the like.

In several applications, a plurality of renewable energy collecting devices are distributed over large areas. They collect solar, wind or water energy, for instance, and convert the collected energy into DC electrical power. The DC electrical power is then converted into AC electrical power, which is used to power one or more loads, or is delivered to an electrical power distribution grid. Input and output electrical parameters of the various devices of a renewable energy power plant, such as voltage, current and/or power are physical quantities, which may require to be measured. The total power produced by a plant, as well as ambient or environmental parameters such as solar radiation, temperature, wind speed, or the like are further physical quantities, which may require to be measured and collected. In some applications, gas or steam pressure, temperature and/or composition may require to be detected, for instance in geothermal power plants.

An exemplary power plant comprised of a plurality of interconnected machines and apparatuses as well as relevant measurement devices is disclosed in EP 3125393. Specifically, this document discloses a power generation plant comprising a plurality of inverters, each of which must be associated with a measurement module, for instance a power meter. Each inverter is further provided with its own measurement devices, such as current and voltage sensors, which can provide data on the power generated by the inverter. In order to automatically associate a measurement device to the relevant inverter, the power measurement generated by the measurement device is compared with the power measurement performed by each inverter using its own measurement devices. Based on said comparison, the association between measuring module and inverter is made.

Complex aggregates, which may require several interconnected machines and apparatuses, may comprise a plurality of measurement devices, which are in turn in data communication relationship with a data collecting arrangement. Measurements of the same physical quantity may come from different sources, i.e. from different measurement devices and delivered to the same data collecting arrangement. Thus, several measurements for the same physical quantity may be available. Some of those measurements may be better suited than others for a given purpose.

A need therefore exists, for improving the way in which data relating to physical quantities of a system are collected and managed.

SUMMARY

In a data collecting system, where at least two measurements of one and the same physical quantity are coming from different sources, i.e. from different measurement devices, the system and method disclosed herein provide for automatically and dynamically detecting which is the best measure for that physical quantity according to a predetermined selection strategy (e.g. the more accurate and/or more precise measurement, the measurement provided with the best granularity, etc., or a combination of these), taking into account that the measurement devices may change anytime (e.g. measurement devices may be added or removed anytime).

According to one aspect, a system is disclosed herein, which comprises a plurality of electronic measuring devices adapted to provide measurement data of a set of physical quantities. The measurement data from each measuring device are characterized a plurality of respective measuring characteristics.

The system can further comprise a data processing arrangement adapted to collect measurement data and measuring characteristics from said plurality of electronic measuring devices. The data processing arrangement can consist of or be allocated to at least one data collecting unit, for instance a local data collecting unit. In other embodiments, the data processing arrangement can be allocated to or consisting of a remote control center. In yet further embodiments, the data processing arrangement can be allocated partly to a local data collecting unit, or more data collecting units, and to a remote control center.

Moreover, the data processing arrangement can be configured to calculate at least two measurements for each physical quantity of said set of physical quantities, based on the measurement data provided by the measuring devices. The data processing arrangement can be further configured to select a best measurement for each physical quantity based on said measuring characteristics.

In exemplary embodiments, at least two measurements are provided for at least one physical quantity. Each one of said two measurements is obtained by measurement data characterized by respective measuring characteristics. The data collecting arrangement will select one of said at least two measurements as the best measurement, based on the measuring characteristics.

The term "physical quantity" as used herein can be understood as any measurable quantity or parameter relating to an apparatus, device, machinery or element, or else any measurable environmental or ambient parameter, or else any measurable quantity or parameter of a substance, material or entity processed by or through an apparatus, device, machinery or element. A physical quantity may thus be an operating parameter of a device, apparatus or system, or a measurable parameter pertaining to an environmental feature whatsoever, which for instance may be required or useful in controlling, managing or supervising any kind of process, system or apparatus. By way of non-limiting examples, physical quantities may be one or more of the following: energy, power, temperature, frequency, voltage current, wind speed, flow, etc.

The term "set of physical quantities" as used herein may be understood as a group of physical quantities, which contains one or more physical quantities. Thus, the term set of physical quantities as used herein encompasses also a set comprised of only one physical quantity.

An electronic measuring device may be in turn comprised of a plurality of components or elements, such as one or more sensors, probes, digital signal processors, analog-digital converters and the like, which may provide data that can directly represent a measured physical quantity or that can be combined to generate measurement data of one or more physical quantities. For instance, an electronic measuring device may provide measurement data on electrical power output of an apparatus by combining electrical current and electrical voltage measurements obtained by current sensors and voltage sensors.

A measuring device may provide measurement data for a single physical quantity or for a plurality of physical quantities. A measuring device may further provide measurement which must be combined with further measurements from one or more further measuring device(s) to provide the measurement of a given physical quantity.

The term "measuring characteristic" as used herein may be understood as a feature which characterizes the measurement data. The measuring characteristic may be determined for instance by the properties of one or more components of a measuring chain, or by one or more parameters according to which the measuring device(s) is(are) controlled or operated. By way of non-limiting example, a measuring characteristic may be one of the following: frequency with which the physical quantity is measured, i.e. measurement frequency; sampling rate; accuracy; precision; granularity; reliability; time elapsed form last instrument calibration; instrument age and degradation, etc., wherein the instrument can be the measuring device or a part thereof.

The measurement of a physical quantity may be obtained by means of a single measuring device. For instance, an anemometer can be used to measure wind speed, or a thermometer can be used to measure the temperature. However in some embodiments the physical quantity may be determined on the basis of a combination of measurements, for instance as a mean value based on measurements from a plurality of identical or different sensors adapted to measure the same physical quantity. For instance, a temperature can be calculated as a mean temperature value based upon a plurality of temperature values measured by several thermometers located in one or several spaced apart positions.

In some embodiments, a physical quantity may be measured based on measuring data of two or more different parameters. For instance, power measurement can be based on a combination of voltage and current measurements.

A single measuring device may provide measurement data for a single physical quantity, or for a plurality of physical quantities. According to some embodiments, at least one measuring device can be provided, which furnishes measurement data for a plurality of physical quantities.

According to some embodiments, at least one measurement of at least one physical quantity can be provided by a combination of measurement data from at least two measuring devices. In other words, measurements of one or more physical quantities may be provided by a single measuring device or can be represented by a function or combination of measurements from multiple measuring devices.

Further features and embodiments of the method according to the invention are set forth in the appended claims and are disclosed in the following description.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
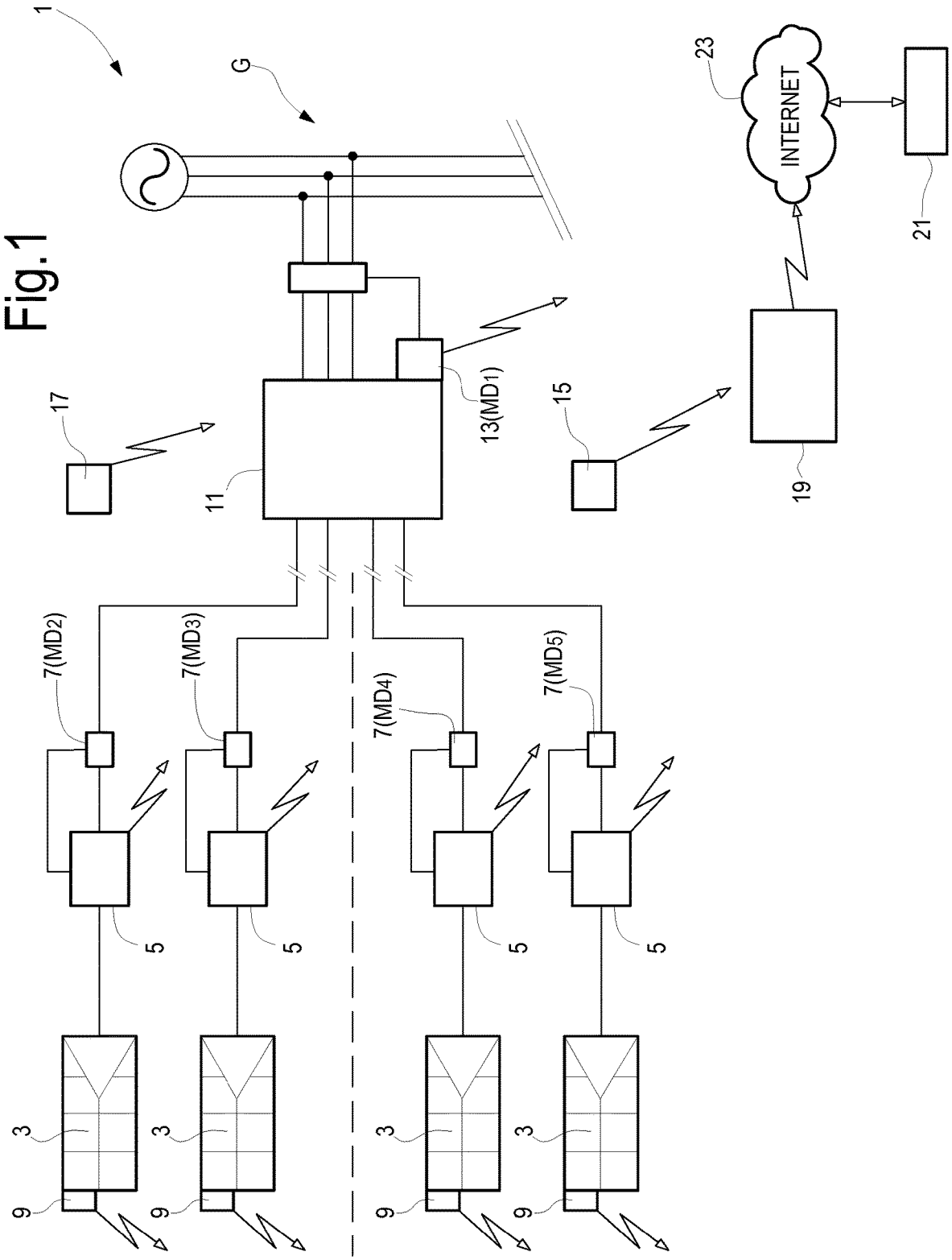
FIG. 1 is a schematic of a photovoltaic power plant which may comprise a data measuring and managing system according to embodiments of the present disclosure.

In FIG. 1 a schematic photovoltaic power system 1 is illustrated as an example of a system wherein the present invention can be embodied. In some embodiments the photovoltaic power system 1 comprises a plurality of photovoltaic panels or photovoltaic panel arrangements 3. The photovoltaic panels form a photovoltaic field. Each photovoltaic panel or panel arrangement 3 may comprise an inverter 5. Each inverter 5 may comprise or be associated with at least one or more electronic measuring devices schematically shown at 7. For example, electronic measuring devices can be provided for measuring one or more physical quantities or electrical operating parameters, such as input voltage, input current, output voltage or output current, active power, reactive power, and the like of the inverter.

Further electronic measuring devices can be combined with each photovoltaic panel or photovoltaic panel arrangement 3. Block 9 schematically represents one or more further electronic measuring devices. The further electronic measuring device(s) may include for instance one or more of the following: solar radiation sensors, temperature sensors, wind sensors, humidity sensors, etc.

The inverters 5 can be connected to an electrical power distribution grid G through an inverter aggregation panel 11. The inverter aggregation panel 11 can be provided with electrical measuring devices schematically shown at 13. For instance, electrical measuring devices can be provided for detecting the output voltage, output current, output active power, output reactive power of the photovoltaic power system 1.

According to some embodiments, the photovoltaic power system 1 can be provided with or combined to additional electronic measuring devices, for instance for measuring physical quantities representing environmental parameters such as temperature, pressure, relative humidity, solar radiation, wind speed, and the like. Blocks 15 and 17 represent generic further electronic measuring devices, for example combined to form an environmental station.

The photovoltaic power system 1 can further comprise a data collection unit 19. The data collection unit 19 can be directly or indirectly connected to one, some or all electronic measuring devices. Specifically, the data collection unit 19 can be in data exchange relationship with said electronic measuring devices, to collect measurement data therefrom. The connection between the data collecting unit 19 and the electronic measuring devices can be a wired connection. In some embodiments, a wireless connection can be envisaged. In some exemplary embodiments, a combination of wired and wireless connections can be provided.

According to some exemplary embodiments, the data collection unit 19 may in turn be connected to a remote control center 21, for instance via an ADSL line, or through a GSM connection, as schematically shown at 23.

The data collection unit 19 can collect measurement data concerning one or more physical quantities.

Either the collecting unit 19 or the remote control center 21, or both in combination, can configure a data collecting arrangement as understood herein. According to some embodiments disclosed here below a data processing arrangement can be embodied in, or allocated to the data collection unit 19, such that the data collecting unit 19 performs preferably all the functions of the data collecting arrangement. For instance the data collecting arrangement determines the measurements of the physical quantities and selects the best measurement for one, some or all physical quantities PQ. This, however, is not mandatory.

Some or all functions performed by the data processing arrangement may be performed at the remote control center 21. Indeed, in some embodiments the data processing arrangement can be partly allocated to the data collecting unit and partly to the remote control center 21, or even entirely to the remote control center 21.

Some physical quantities may be measured by different measuring devices, such that more than just one measurement of a given physical quantity is available to the data collection unit 19. In some circumstances it may be useful to select one or the other of multiple measurements available for a given physical quantity. In some cases, a measurement of a given physical quantity can be provided by a single electronic measuring device. In other cases, a measurement of a given physical quantity can be provided by a combination of measurement data provided by a plurality of electronic measuring devices.

For instance, in the example embodiment of FIG. 1, the total electrical power delivered by the photovoltaic power system 1 to the electrical power distribution grid G can be determined on the basis of a single measurement taken at the inverter aggregation panel 11. Alternatively, the total electrical power can be calculated by summing the output power values measured by the electronic measurement devices provided at each inverter 5.

Similarly, physical quantities relating to environmental parameters may be obtained by one or the other of the electronic measuring devices located in environmental stations 15 and 17. Alternatively, said environmental parameters may be calculated as a mean value on the basis of measurements taken at both said environmental stations. Alternatively, environmental parameters can be calculated as a mean value of measurements from two or more electronic measuring devices or sensors 9 associated with each photovoltaic panel or panel arrangement 3.

The measurement data are characterized by a set or plurality of measuring characteristics. The measuring characteristics can be determined by features of the electronic measuring devices. Therefore, if different measurements for the same physical quantity are available to the data processing arrangement, which can be allocated to the data collecting unit 19, said different measurements will usually have different characteristics. According to the present disclosure, the data processing arrangement can be configured to select the best measurement for a given physical quantity using a selection strategy based on the measuring characteristics. Exemplary embodiments of selection strategies will be provided below.

While FIG. 1 illustrates a photovoltaic power system 1, it shall be understood that this is just one example of a system, wherein the invention can be embodied. Thus, in the following description reference will be made to generic data collecting units, data processing arrangements, electronic measuring devices and measured physical quantities.

Figure 2:
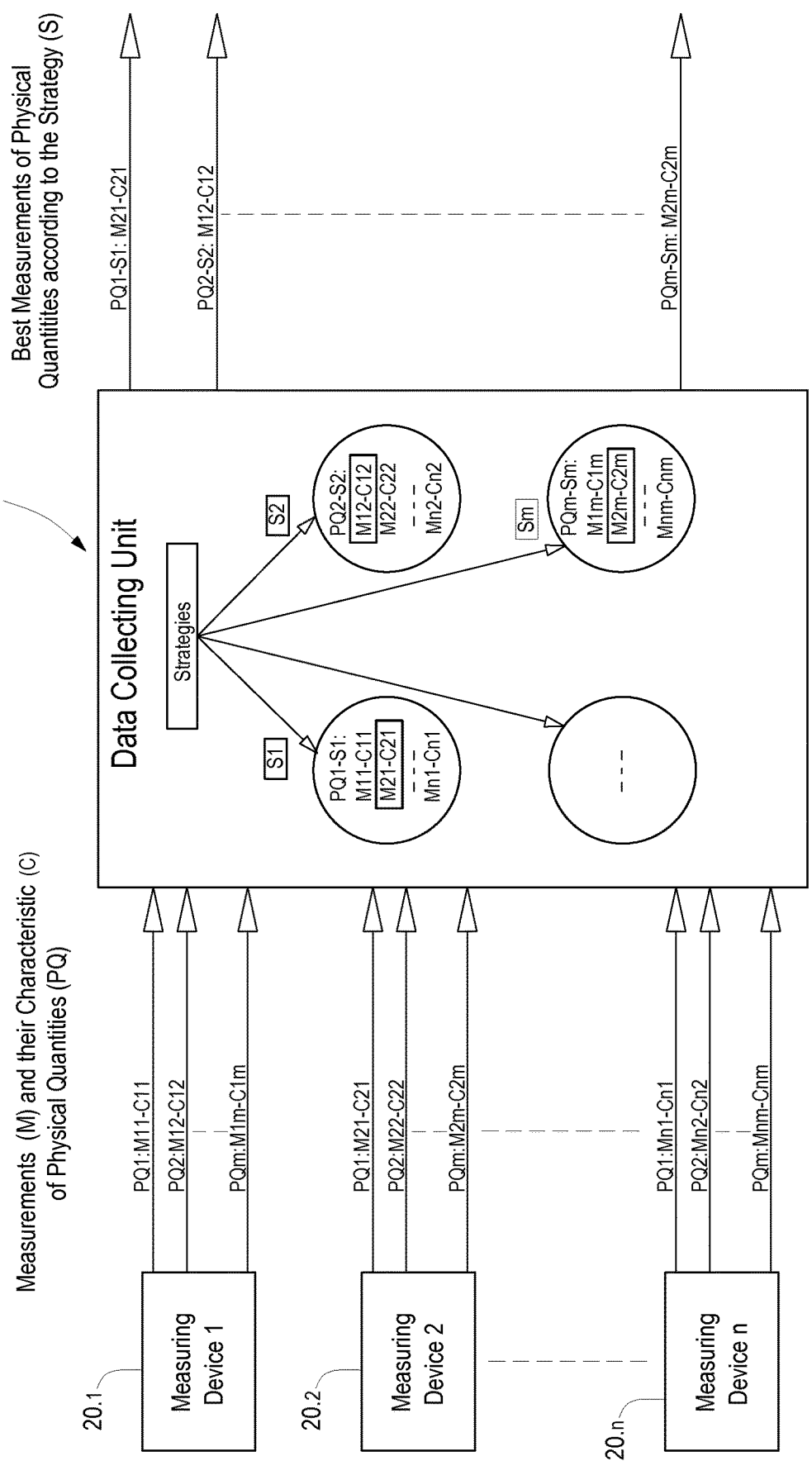
FIGS. 2 and 3 illustrate block diagrams of data collecting units and measuring systems according to embodiments of the present disclosure.

FIG. 2 shows a functional block diagram illustrating the selection of best measurements for a plurality of physical quantities based on respective selection strategies. In the embodiment disclosed herein, the data processing arrangement is allocated to a data collection unit schematically represented by block 19 in FIG. 2. Reference numbers 20.1, 20.2, ... 20.$n$ illustrate a plurality of electronic measuring devices. Each electronic measuring device 20.$j$ can be for instance any one of devices 7, 9, 13, 15, 17 of the exemplary photovoltaic power system 1 of FIG. 1. Each electronic measuring device 20.$i$ provides measurement data, i.e. measurements, Mij of a respective physical quantity PQj. Each measurement Mij is characterized by a set or plurality of measuring characteristics. The set of characteristics is labeled Cij.

In the schematic of FIG. 2 the first electronic measuring device 20.1 provides measurement data (M1$j$) for a plurality of "m" physical quantities PQ1, PQ2, ... PQm. In some embodiments m=1. Measurement M1$j$ provided by measuring device 20.1 relates to physical quantity PQj. Each measurement of a generic physical quantity by electronic measuring device 20.1 is characterized by a set of measuring characteristics C1$j$. Thus, measurement data (M1$j$) of physical quantity PQj are characterized by measuring characteristics C1$j$. The relationship between physical quantity PQj, measurement data thereof (M1$j$) and relevant measuring characteristics (C1$j$) is expressed as:

$$PQj{:}M1j\text{--}C1j$$

As noted above, by way of non-limiting example, the measuring characteristics forming a set or plurality of measuring characteristics may include one or more of the following: frequency with which the physical quantity is measured, i.e. measurement frequency; sampling rate; accuracy; precision; granularity; reliability; time elapsed form last instrument calibration; instrument age and degradation.

In the schematic of FIG. 2, each electronic measuring device $20.i$ measures the value of the same set of physical quantities PQj (j=1, 2 . . . m; wherein m may be any integer equal to or greater than 1). Thus the second electronic measuring device 20.2 provides measuring data for the same "m" physical quantities PQ1, PQ2, PQm. Each measurement data set provided by the electronic measuring device 20.2 for the physical quantity PQj is labeled $M2j$ (j=1, 2, . . . m) and is characterized by a plurality of measuring characteristics $C2j$.

The relationship between the physical quantity PQj, the relevant measurement data Mij provided by the generic electronic measuring device $20.i$, characterized by the respective measuring characteristics Cij is expressed as follows:

$$PQj{:}Mij\text{--}Cij$$

In the exemplary embodiment of FIG. 2, the data collection unit 19 has therefore n available measurements Mij (i=1, 2, . . . , n) for each one of the physical quantities PQj (j=1, 2, . . . , m). The data collection unit 19 checks the measuring characteristics (Cij) of each received measurement Mij for every PQj, and identifies the best measurement according to a chosen Strategy (Sj) for each PQj.

By way of example, according to strategy S1, the best measurement for physical quantity PQ1 is the measurement M21, which is characterized by measuring characteristics C21. Similarly, according to strategy S2, the best measurement for physical quantity PQ2 is the measurement M12, which is characterized by measuring characteristics C12. Finally, according to strategy Sm, the best measurement for physical quantity PQm is the measurement $M2m$, which is characterized by measuring characteristics $C2m$.

Thus the data processing arrangement allocated to the data collecting unit 19 generates an output data string which is given by the following combination of measurements for each one of the m physical quantities PQj:

$$PQ1\text{--}S1{:}M21\text{--}C21$$

$$PQ2\text{--}S2{:}M12\text{--}C12$$

. . .

$$PQm\text{--}Sm{:}M2m\text{--}C2m$$

In the embodiment of FIG. 2 each single measurement Mij of a given physical quantity PQj is provided by a single electronic measuring device $20.j$. This, however, is not mandatory. As noted above, the measurement of a physical quantity may be represented by a function or combination of measurements coming from a plurality of electronic measuring devices $20.j$. This is pictorially represented by the functional diagram of FIG. 3. In this embodiment five electronic measuring devices $20.i$ (i=1, 2, . . . , 5) are provided. It shall be understood that this is just by way of example and that a different (larger or smaller) number of electronic measuring devices can be provided and put into data exchange relationship with the data collecting unit 19.

Each electronic measuring device $20.i$ provides measurement data for the same physical quantity PQ1. Mi and Ci (i=1, 2 . . . , 5) generically indicate the measurement for physical quantity PQ1 provided by electronic measuring device $20.i$ and the relevant measuring characteristic. Thus, the set of measuring devices 20.1-20.5 cumulatively provide five measurements of the same physical quantity PQ1, each measurement being characterized by a respective set of characteristics Cj, as follows:

$$PQ1\_1{:}M1\text{--}C1$$

$$PQ1\_2{:}M2\text{--}C2$$

$$PQ1\_3{:}M3\text{--}C3$$

$$PQ1\_4{:}M4\text{--}C4$$

$$PQ1\_5{:}M5\text{--}C5$$

The measurement of the physical quantity PQ1 may be obtained as a function or combination Ma of measurements M1 and M2:

$$Ma=f(M1,M2)$$

Alternatively, the measurement of the physical quantity PQ1 can be obtained as a function or combination Mb of measurements M3, M4 and M5:

$$Mb=f(M3,M4,M5)$$

The first combination or function of measurements Ma will be characterized by a combined measurement characteristic Ca which is a function of C1 and C2, i.e.

$$Ca=f(C1,C2).$$

The second combination of measurements Mb will be characterized by a combined set of measurement characteristics Cb which is a function of C3, C4 and C5, i.e.

$$Cb=f(C3,C4,C5).$$

Figure 3:
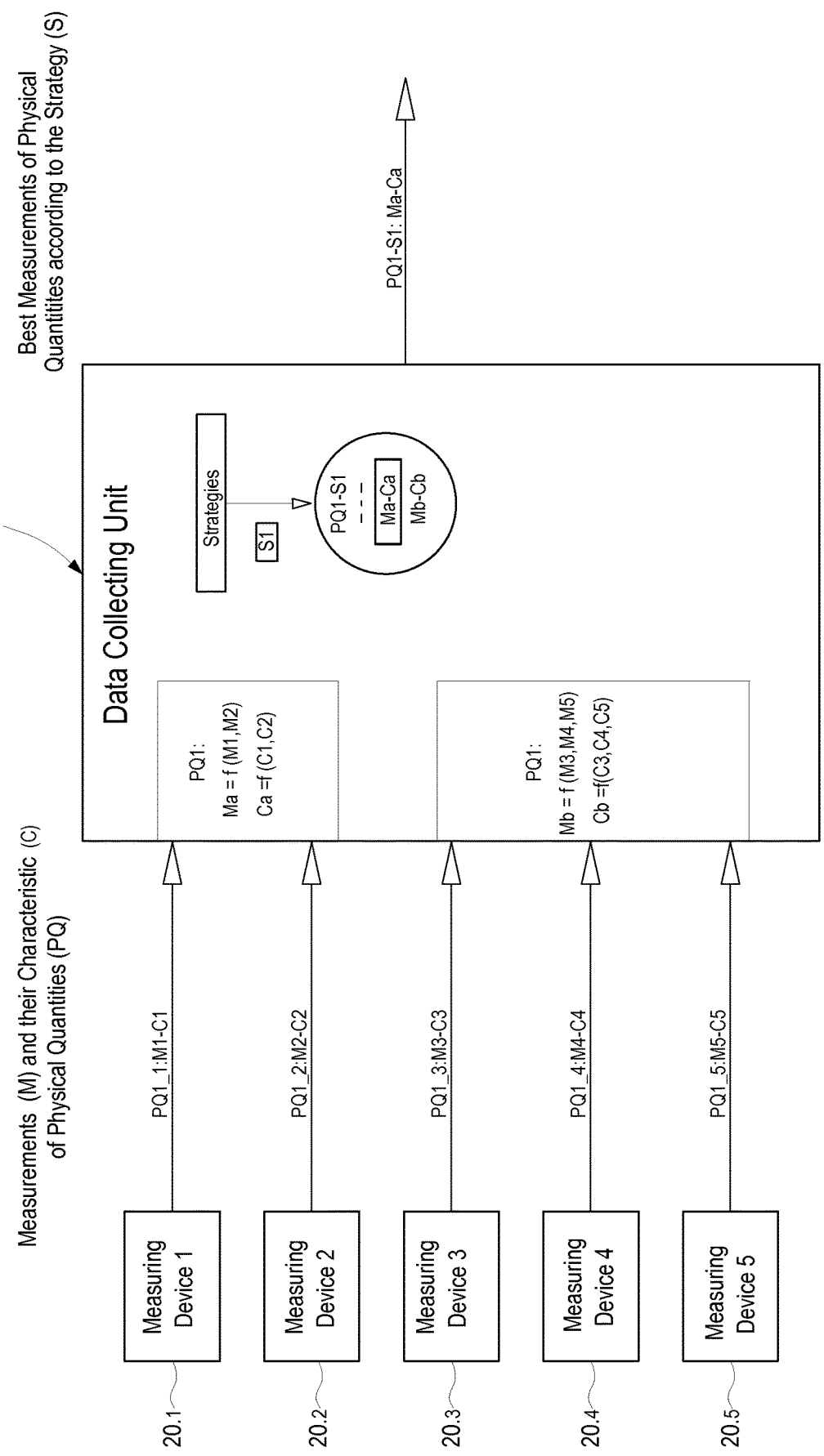

In the schematic of FIG. 3, the strategy for selecting the best measurement indicates that the best measurement is Ma. The output data from the data collecting unit will therefore be PQ1–S1:Ma–Ca.

The data processing arrangement allocated to data collecting unit 19 has information on the available electronic measuring devices, on the kind of physical quantities measured and relevant measurement characteristics, on the selecting strategies for each measured physical quantity, as well as on the status of each electronic measuring devices.

The status and number of electronic measuring devices in a system can change over time. For instance, new electronic measuring devices may be added, existing measuring devices may be de-activated, removed or replaced by others, e.g. providing different measuring characteristics. For instance, failure of a measuring device will cause the measuring device to be de-activated. Revamping of the system may involve replacement of old-technology measuring devices with new ones having better measuring characteristics, e.g. higher precision, higher accuracy, higher sampling rate, better granularity or the like. Yet further modifications of the system may involve addition of components, elements or parts. For instance, in case of a photovoltaic power plant, the photovoltaic field can be enlarged by adding new photovoltaic strings 3 and relevant inverters.

The data processing arrangement allocated to data collecting unit 19 can be configured to detect any change in the system, including a status change of one or more measuring devices, as well as the addition, removal, activation or deactivation of electronic measuring devices and to re-determine the best measurement for each physical quantity following said change.

According to some embodiments, an electronic measuring device may take one of several possible statuses. The status of an electronic measuring device can be set as "undefined", "new", "active", "non-active". If an electronic measuring device is not characterized, i.e. no information on the measuring characteristics thereof is available to the data processing arrangement allocated to data collecting unit 19, the device may take the "undefined" status. An undefined device can change status to "new", if the measuring characteristics thereof are provided to the data processing arrangement allocated to data collecting unit 19. An "active" electronic device may switch to "non-active", if the device is switched off, for instance. A "non-active" device can be switched back to the "active" status.

Figure 4:
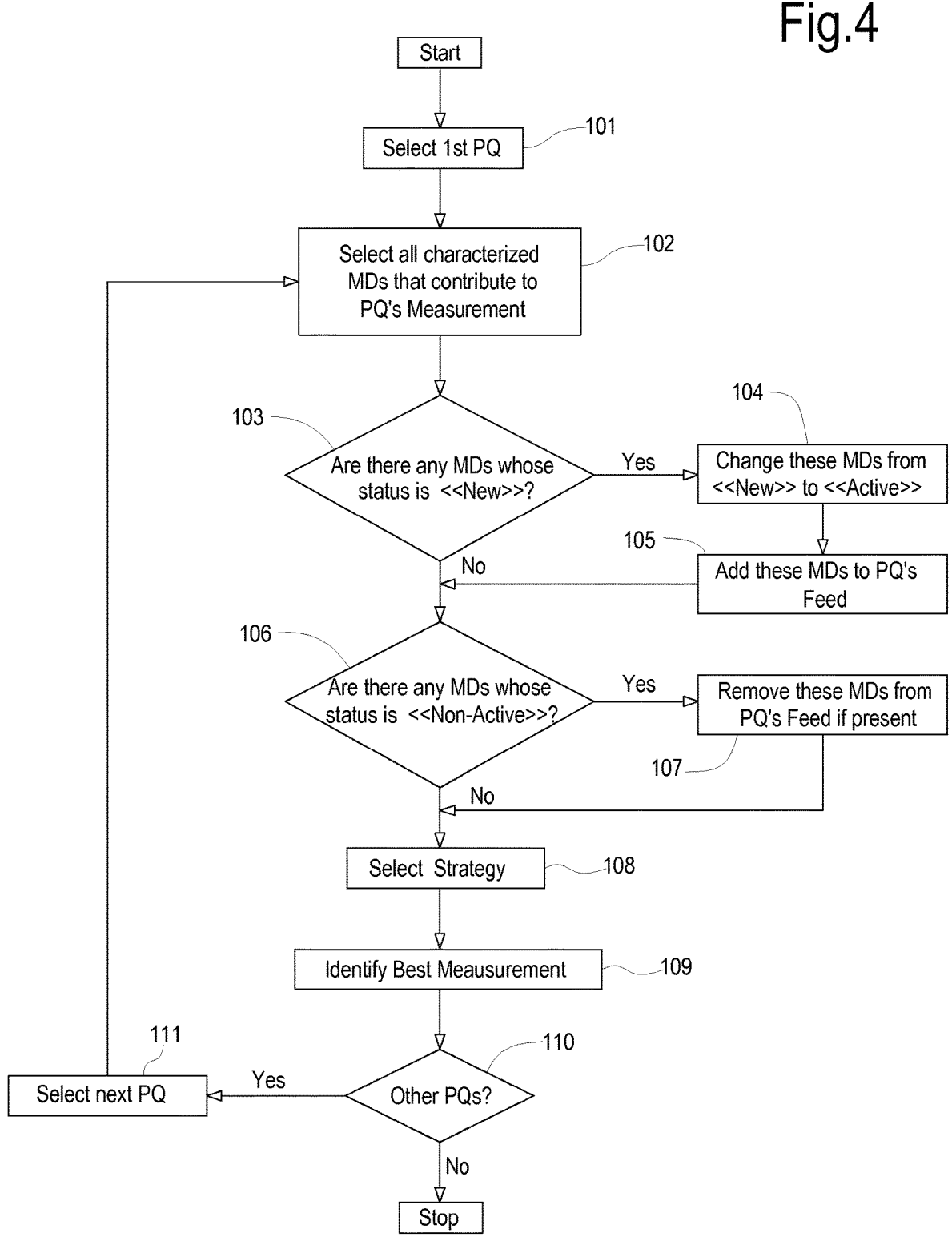
FIG. 4 illustrates a flow chart for the selection of the best measurement according to a selection strategy.

For each physical quantity PQ, a list of active electronic measuring devices contributing to its measurement is built. This list is called "Feed". This latter is updated every time an electronic measuring device changes status. Once a feed is provided to the data processing arrangement in data collecting unit 19, the best measurement of each physical quantity PQ can be selected by the data processing arrangement in the data collecting unit 19 according to the selecting strategy with a best measurement selection routine summarized in the flow chart of FIG. 4

The routine can be run for all physical quantities PQ which are measured by the set of available electronic measuring devices. The routine starts by selecting a first physical quantity PQ (step 101). The data processing arrangement in data collecting unit 19 then selects all characterized electronic measuring devices (named MD in the flow chart of FIG. 4) that contribute to the one or more measurements of the selected physical quantity PQ, see step 102. In the next step 103 electronic measuring devices having switched to the "new" status are detected. If an electronic measuring device in the "new" status is detected, the data collecting unit causes the status to change from "new" to "active", see step 104 and the measuring devices which have been switched to "active" status are added to the feed, of the physical quantity concerned in step 105. If no electronic measuring device MD is in the "new" status or once it has been switched to "active" and added to the feed, the routine looks for electronic measuring devices which are in the "non-active" status in step 106. If any such measuring device is found, it is removed from the feed in step 107.

An updated feed is thus generated by the data processing arrangement of data collecting unit 19, wherein all the available measuring devices MD are in the "active" status and are characterized by the relevant measuring characteristics. The selecting strategy for the physical quantity considered is selected in step 108 and the best measurement is identified in step 109 using the selecting strategy.

The routine for the first physical quantity PQ is thus completed and the data processing arrangement allocated to data collecting unit 19 checks if other physical quantities PQ are present, see step 110 and, if yes, it selects the next physical quantity in step 111. The routine is run again starting from step 102. The routine is run for as many times as required to identify the best measurement for each physical quantity which must be measured.

The data collecting unit 19 can transfer measurement data to the remote control center 21. The remote control center 21 may be accessed by the user, for instance the owner of the photovoltaic power system 1, through a web portal. In some embodiments the data collecting unit may be configured to transfer all measurement data to the remote control center 21, including those which are not the best measurements for the measured physical quantities. In such case the user will have information on all measured data, and will also be provided with the selected best measures for each physical quantity. In other embodiments, only the best measurements for each physical quantity can be transferred from the data collection unit 19 to the remote control center 21.

As a matter of fact, where the interface with the user takes place and/or where the measurement selection takes place is a matter of choice. The interaction with the user, or the best measurement selection, or both can be performed at a remote control center 21, or at a local control unit 19, for instance. As mentioned previously, the data processing arrangement can indeed be allocated to a remote control center 21, to a local data collecting unit 19, or can be allocated partly to the remote control center 21 and partly to the data collecting unit, such that some of the above described functions can be performed at the data collecting unit 19 and some at the remote control center.

In some embodiments, data may be stored at the data collection unit 19 and accessed by the user directly through the data collection unit 19.

Figure 5:
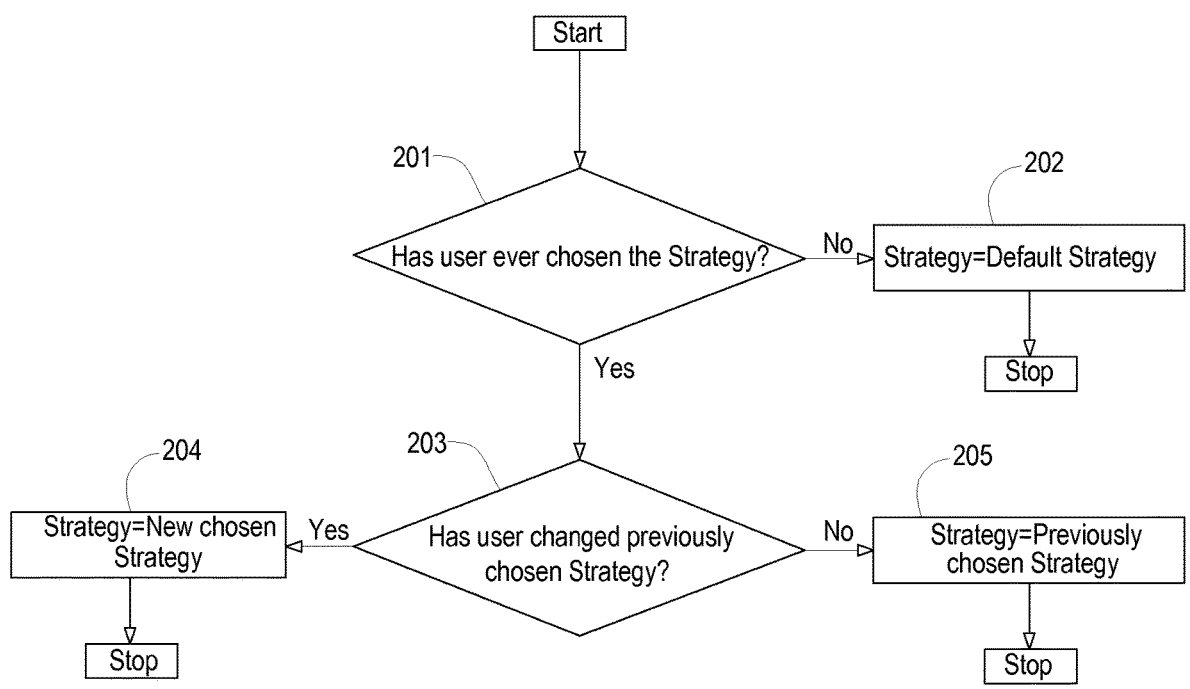
FIG. 5 illustrates a flow chart showing a method for setting or modifying the best measurement selection strategy.

The final users can decide to choose the strategy for best measurements identification. If the user does not make any choice, the best measurement can be selected by the data collecting processing arrangement according to a default strategy. An embodiment for the selection of a default strategy or for modifying a previously selected strategy based on a change by the user is depicted in FIG. 5. In step 201 the data processing arrangement allocated to data collecting unit 19 determines whether the user has chosen a strategy for best measurement selection. If not, a default strategy is set (step 202). If the user changes the selection strategy (step 203) the newly selected strategy is set as the current strategy for best measurement determination (step 204). The routine represented in FIG. 5 can be run for each physical quantity.

Referring now again to FIG. 1 and with continuing reference to FIGS. 2 to 5, examples of strategies for the selection of best measurements in the case of a photovoltaic power system 1 will be illustrated.

One of the physical quantities PQs of interest in a photovoltaic power system 1 (FIG. 1) is the energy produced. Said energy can be measured by an energy meter which can be arranged in or combined with the inverter aggregation panel 11. The energy meter can be arranged e.g. in block 13. The energy measurement from the energy meter can be provided to the data collection unit 19. The energy meter represents a first measuring device MD1 and provides a first measurement M1 for the measured physical quantity PQ (energy). The measurement M1 can be characterized by several measuring characteristics, cumulatively labeled as C1. Thus, C1 indicates a set or plurality of measuring characteristics which characterize the measuring device MD1. These measuring characteristics may include measuring accuracy, measuring precision, measuring sampling rate, for instance.

Moreover, each photovoltaic inverter 5 can be provided with sensor(s) for detecting the output electrical energy of each photovoltaic inverter 5 and providing said measurement data to the collecting unit 19. The respective electronic measuring devices, which provide a local measurement of the energy generated by the respective photovoltaic inverter 5, are indicates here below and in FIG. 1 as MD2, MD3, MD4, MD5. The measurements of measuring devices MD2, MD3, MD4, MD5 are indicated as M2, M3, M4, M5. Each measurement Mj (j=2-5) is characterized by a respective set or plurality of measuring characteristics Cj (j=2-5). Similarly to MD1 and its set of characteristics C1, reference Cj cumulatively designates the set of measuring characteristics of a given device Mj. Each set or plurality of measuring characteristics can contain respective measuring accuracy, measuring precision, measuring sampling rate and/or further measuring characteristics of the measurement. The total energy produced by the photovoltaic power system 1 can thus be calculated by summing the data M2, M3, M4 and M5, i.e. the energy produced by each inverter 5.

The data processing arrangement allocated to the data collecting unit 19 receives, therefore, two measures of the total energy produced, namely $$Ma = M1$$

$$Mb = M2 + M3 + M4 + M5.$$

The energy meter MD1 associated with the inverter aggregation panel 11 and the energy measurement devices MD2, MD3, MD4, MD5 associated with each photovoltaic inverter 5 are characterized in the data collection unit 19, i.e. the data processing arrangement allocated to data collecting unit 19 knows the sets or pluralities of measuring characteristics C1, C2, C3, C4, C5.

Both measures Ma and Mb are characterized by respective set or pluralities of measuring characteristics Ca and Cb, which are a function of measuring characteristics C1 and C2, C3, C4, C5, respectively.

According to some embodiments, the precision of the measurement M1 provided by the energy meter MD1 is higher than the precision of the measurements M2, M3, M4, M5 provided by the measuring devices MD2, MD3, MD4, MD5 of the single inverters 3. The set of measuring characteristics Ca is therefore characterized by a higher measuring precision than the set of measuring characteristics Cb.

The data processing arrangement in data collecting unit 19 can be configured to use a selection strategy based on measurement precision. In such case, the measurement provided by the energy meter is selected as the best measure. Thus, the best measurement among Ma and Mb will be Ma, because said measurement is the one having the highest precision, based on the sets of measurement characteristics Ca and Cb.

The highest measurement precision is not the only possible selection strategy. For instance, the user may modify the selection strategy (see FIG. 5), e.g. to configure the data processing arrangement in the data collecting unit 19 such that the best measurement will be selected as the one having the highest sampling rate. If the sampling rate of the measuring devices MD2, MD3, MD4, MD5 is higher than the sampling rate of the energy meter MD1, the new selection strategy will cause the data processing arrangement to choose the measurement Mb, instead of Ma as the best measurement for the total energy produced by the photovoltaic power system 1.

New energy meters and/or new inverters 5 can be added to the photovoltaic power plant 1. Additionally, energy meters and/or inverters 5 may be removed from the photovoltaic power plant or may be deactivated. Furthermore, energy meters and/or inverters may be replaced with different ones, for example having higher performances. The replaced or added energy meters and/or inverters may have different sets o measuring characteristics, e.g. higher or lower sampling rates, higher or lower measurement precisions, or the like. Any change in the electronic measuring devices of the photovoltaic power system 1 will be detected by the data processing arrangement in data collection unit 19 as described above (see FIG. 4) such that the data processing arrangement will always be able to generate an updated feed and select the best measurement based on the selecting strategy.

Ambient temperature in a photovoltaic power plant 1 can be another physical quantity PQ which requires to be measured. The ambient temperature can be measured by environmental station 17, by environment station 15 or by both. The measured temperature is sent to the data collecting unit 19. Ambient sensors can also be located at one or more of the photovoltaic panel arrangements 3, e.g. as part of one or more of blocks 9. Each sensor measures the local ambient temperature and sends the measurement to the data collecting unit. The ambient temperature in the photovoltaic power system 1 can be calculated e.g. by averaging the temperatures measured by these sensors or by some of them. In some embodiments, all available sensors can be grouped in two or more sets, and corresponding two or more average temperature values can be calculated as mean values using the measurement data of the sensors of each set.

Each temperature sensor can be characterized by respective measuring characteristics, i.e. by a respective set or plurality of measuring characteristics, known to the data processing arrangement. For instance measurement accuracy, measurement precision, sampling rate can be measuring characteristics which characterize each ambient temperature measure. According to some embodiments, the highest measurement accuracy can be used as selection strategy by the data processing arrangement allocated to data collecting unit 19 to select the best measurement. If environmental station 15 provides the temperature measurement with the highest accuracy, then the best measurement selected by the data processing arrangement allocated to the data collecting unit 19 will be the one provided by environmental station 15. If the environmental station 17 is replaced with a newer one having more accurate sensors, the data collection unit will detect the change and will select the temperature measure from environmental station 17.

The user may decide to change strategy and for instance require the data processing arrangement to select the temperature measurement which has the highest sampling rate. The highest sampling rate characteristic may be the one of environmental station 17, for example. In such case, once the selection strategy is changed by the user, the data processing arrangement allocated to the data collecting unit 19 will select the temperature measurement from environmental station 17.

In yet further situations, the user may select a further strategy which requires to select the best measurement as the one which is calculated as the average of the largest number of individual local measurements. In this case, the data processing arrangement will select the average temperature calculated on the basis of local temperatures measured at each photovoltaic inverter as the best measure.

Generally speaking, as can be readily appreciated from the above description, the "best measurement" for a given physical is not an absolute entity, since each measurement is characterized by at least two measuring characteristics, and in general by a set or plurality of measuring characteristics. The best measurement can be selected once the selection strategy has been set. The selection strategy provides indication on which of the several measuring characteristics is the controlling one. Once the controlling measuring characteristic has been established, the best measurement is selected by comparing the measuring characteristic established by the selection strategy.

From the above description of several embodiments, the method disclosed herein can be described in general terms as follows:
- a physical quantity PQ is measured by N different sensors, sensor aggregates, measuring devices or device aggregates, for instance;
- each sensor, device or aggregate provides one measurement Mj (with j=P1 . . . N) for the same physical quantity PQ, such that N measurements of the same physical quantity PQ are available;
- each measurement Mj is characterized by a set or plurality of measuring characteristics Cj[Cj1, Cj2 . . . Cjm], wherein m is the total number of characteristics for each measurement Mj;
- the selection strategy S establishes which characteristic is to be used as the selective characteristic. For instance, the sampling rate can be the selective characteristic. The selective characteristic is labeled here on as Cs;
- each set of measuring characteristics contains, among others, also the selective characteristic. For instance, the set Cj[Cj1, Cj2, . . . Cjs, . . . Cjm] of measuring characteristics for the generic measurement Mj contains, among others, the selective characteristic Cjs. If the selection strategy is based on the sampling rate, then Cjs is the sampling rate of measurement Mj;
- the best measurement Mj is the one for which Cjs is the highest (the highest sampling rate);
- the opposite criterion could be used: the lowest sampling rate, rather than the highest sampling rate. In that case, the best measurement Mj would be the one characterized by the lowest Cjs (the lowest sampling rate);
- if the selection strategy is changed, the best measurement may change;
- for instance, assume the selection strategy S establishes that the selective characteristic is Cs1 (different from Cs), for instance the best measurement is the one having the highest precision;
- each measurement Mj contains, among others, the measuring characteristic Cjs1, i.e. the precision of the measurement. The best measurement will be measurement Mi, which is characterized by the highest value of Cis1, i.e. the highest precision. Best measurement Mi may be different from best measurement Mj. In other words, the best measurement is not the "absolute best", but rather the best according to the adopted selection strategy.

The method and system disclosed herein, therefore, allow to automatically select the best measurement among several available measurements for the same physical quantity, based on technical considerations involving the measuring characteristics of several different apparatuses, devices, sensors, instrumentalities or aggregates thereof, used to measure the physical quantity. The method and system disclosed herein allow on the one hand to establish the best measurement each time anew when the selection strategy is changed. Moreover, the method and system disclosed herein allow also to automatically select the best measurement, based on a given selection strategy, when features of the system change, for instance when a probe, sensor or other measuring or detecting instrumentality is replaced, repaired, or re-calibrated, for instance, or else if additional measuring devices are added to provide additional measurements of the same physical quantity.

While in the above exemplary embodiments of the selection method direct measurements of a given physical quantity PQ are used, there may be situations where the physical quantity is measured indirectly, or situations where direct and indirect measurements for the same physical quantity PQ are available. By way of example, the power generated by an array of photovoltaic panels can be measured directly by a power meter, or else indirectly starting from current and voltage measurements.

Let's assume that in the photovoltaic plant of FIG. 1 the measurement devices 7 of each photovoltaic panel arrangement 3 comprise current sensors and voltage sensors and are adapted to provide data on the generated power based on current and voltage measurements. The total power generated by the plant can be calculated as the sum of the powers measured indirectly by the several photovoltaic panel arrangements 3, each of which calculates the power as the product of detected voltage and current values. In addition to indirect power measurements through current and voltage at inverter level, a power meter can be provided to directly measure the power at the inverter aggregation panel 11. A power meter MD1 can be available for instance in the electronic measuring device 13. The power meter MD1 provides a direct measurement of the total power generated by the plant.

Here on the direct measurement of the total power output provided by power meter MD1 is labelled Ma. The set of measuring characteristics of the power meter are designated Ca. According to some embodiments, the measurement characteristics an include: accuracy, precision, sampling rate, a combination thereof.

Each of the four inverters 5 and relevant measurement devices MD2-MD5 can be adapted to provide an output voltage measurement Mj1 (where j=2-5) and an output current measurement Mj2 (where j=2-5) and to calculate an output power Mj (j=2-5) based on the product between output current and output voltage. Each voltage measurement Mj1 (j=2-5) is characterized by a set or plurality of measurement characteristics Cj1 and each current measurement Mj2 is in turn characterized by a set or plurality of measurement characteristics Cj2. Each set of measurement characteristics can include, for instance: accuracy, precision, sampling rate, or others, as well as combinations thereof.

Each inverter and relevant measuring devices MDj thus provides:
- Mj1: measurement of the output voltage of inverter j (j=2-5), with a set or plurality of measurement characteristics Cj1;
- Mj2: measurement of the output current of inverter j, with a set of measuring characteristics Cj2;
- Mj: calculation (indirect measurement) of power generated by inverter j, calculated as Mj1*Mj2, characterized by a set or plurality of measuring characteristics Cj, which is a function of the set or plurality of characteristics Cj1 and Cj2.

The total power generated by the photovoltaic plant is obtained by the sum of the power values calculated by each measuring device arrangement MDj of the various inverters. This power value is labeled Mb and is given by:

$$Mb=M2+M3+M4+M5.$$

The set or plurality of measuring characteristics Cb which characterizes the power value Mb is determined on the basis of the four sets of characteristics Cj.

The measurement Ma or Mb will be selected, based on the selection strategy and on the sets of characteristics Ca and Cb of the two measurements obtained as described above. For instance, if the inverters provide a higher sampling rate but a lower precision than the power meter at the inverter aggregation panel, then measure Ma will be selected if the strategy is based on the highest precision, while measure Mb will be selected if the strategy is based on the higher sampling rate.

For instance, if the user is interested in reconstructing the shape of power production, i.e. the power production curve as a function of time, he might prefer adopting a high sampling rate, accepting a lower precision. In this case, the selection strategy will select the power measurement obtained by the individual inverters 5 through measuring devices MD2-MD5.

According to some embodiments, the physical quantity to be measured is the energy produced by the plant. Similarly to the power, also the energy can be measured using an electronic measuring device MD1 at the inverter aggregation panel 11, or alternatively using electronic measuring devices MDj (j=2-5) at the single inverters 5. In the latter case the energy generated by the plant 1 will can be calculated as the sum of the energy generated by each inverter 5, i.e. as a sum of energy measurements from the various electronic measure devices MDj.

While in the previously discussed embodiments the measuring characteristics are assumed to be constant in time, this may not always be the case. In some situations, for example, one or more measuring characteristics may vary over time. By way of example, a situation may occur, wherein the sampling rate of a measuring device changes over time, such that in different time intervals, different devices provide the highest sampling rate. If the selection strategy chosen by the user is based on the highest sampling rate, the method may involve switching from one selected measurement to another selected measurement for the same physical quantity PQ, based upon the current value of the sampling rate of the various measuring devices MD involved.

Similarly, accuracy of the measurement may change, for instance, because one or more measuring devices are re-calibrated. If accuracy is the choosing criterion for selecting the preferred measurement, one measurement may be selected for a given time interval, and another measurement may be selected, for instance upon recalibration of the relevant measuring device(s).

What is claimed is:

1. A system comprising:
   a plurality of electronic measuring devices each adapted to provide measurement data of a set of physical quantities; wherein the measurement data from each measuring device are each characterized by a plurality of respective measuring characteristics;
   a data processing arrangement, configured to calculate at least a first measurement for each physical quantity based on respective measurement data from at least a first electronic measuring device and a second measurement for each physical entity based on respective measurement data from at least a second electronic measuring device, wherein each of the at least first and second measurements is available for selection and characterized by a respective plurality of measuring characteristics; and
   the data processing arrangement is further configured to select and output a best measurement for each physical quantity based on said measuring characteristics, wherein the data processing arrangement is provided with at least one data selection strategy for each physical quantity, the best measurement for each physical quantity being selected from among the at least first measurement and second measurement and on the basis of the respective data selection strategy and the plurality of measuring characteristics.

2. The system of claim 1, wherein each data selection strategy comprises at least one routine for selecting the best measurement of the respective physical quantity according to the measurement characteristics of the measurement data relating to said physical quantity.

3. The system of claim 1, wherein at least one measurement of at least one physical quantity is based on a combination of measurement data from at least two measuring devices.

4. The system of claim 1, wherein at least one measurement of at least one physical quantity is based on measurement data from a single measuring device.

5. The system of claim 1, wherein the data processing arrangement is adapted to dynamically detect a status change of the electronic measuring devices and to re-determine the best measurement for at least one of said physical quantities when the status of at least one of said electronic measuring devices changes.

6. A method for managing measurement data of a set of physical quantities, comprising the following steps:
   collecting measurement data of a set of physical quantities from each of a plurality of electronic measuring devices, the measurement data being characterized by a plurality of respective measuring characteristics;
   calculating at least a first measurement for each physical quantity based on respective measurement data from at least a first electronic measuring device and a second measurement for each physical entity based on respective measurement data from at least a second electronic measuring device, each measurement being characterized by a respective plurality of measuring characteristics;
   selecting a best measurement for each physical quantity among said at least two measurements based on a respective data selection strategy and on the pluralities of measuring characteristics of said at least first and second measurements; and
   generating an output data string corresponding to the selected best measurement for each physical quantity among said at least first and second measurements.

7. The method of claim 6, wherein each data selection strategy comprises at least one routine for selecting the best measurement of the respective physical quantity according to the measurement characteristics of the measurement data relating to said physical quantity.

8. The method of claim 6, wherein at least one measurement of at least one physical quantity is based on a combination of measurement data from at least two measuring devices.

9. The method of claim 6, wherein at least one measurement of at least one physical quantity is based on measurement data from a single measuring device.

10. The method of claim 6, comprising the steps of automatically detecting a status change of the electronic measuring devices; and re-determining the best measurement for at least one of said physical quantities when the status of at least one of said electronic measuring devices changes.

11. A method for managing measurement data of a set of physical quantities, comprising the following steps:
   collecting measurement data of a set of physical quantities;
   calculating at least a first measurement for each physical quantity, based on respective measurement data from at least a first electronic measuring device and a second measurement for each physical entity based on respective measurement data from at least a second electronic measuring device, each measurement being characterized by a respective plurality of measuring characteristics;

providing a data selection strategy for each physical quantity, said selection strategy identifying which one of said plurality of measuring characteristics is used to select the best measurement;

selecting a best measurement for each physical quantity using the respective measuring characteristic identified by the selection strategy; and outputting the selected best measurement for each physical quantity.

* * * * *